US007273583B2

(12) United States Patent
Rue et al.

(10) Patent No.: US 7,273,583 B2
(45) Date of Patent: Sep. 25, 2007

(54) PROCESS AND APPARATUS FOR UNIFORM COMBUSTION WITHIN A MOLTEN MATERIAL

(75) Inventors: David M. Rue, Chicago, IL (US); Hamid A. Abbasi, Napervillle, IL (US); Mark J. Khinkis, Morton Grove, IL (US); Vladimir M. Olabin, Kyiv (UA); Oleksandr Maksymuk, Kyiv (UA)

(73) Assignee: Gas Technology Institute, Des Plaines, IL (US)

( * ) Notice: Subject to any disclaimer, the term of this patent is extended or adjusted under 35 U.S.C. 154(b) by 640 days.

(21) Appl. No.: 10/832,587

(22) Filed: Apr. 27, 2004

(65) Prior Publication Data

US 2005/0236747 A1    Oct. 27, 2005

(51) Int. Cl.
*C03B 5/16*    (2006.01)
(52) U.S. Cl. ...................................... 266/266; 266/242
(58) Field of Classification Search ................ 266/242, 266/200, 268
See application file for complete search history.

(56) References Cited

U.S. PATENT DOCUMENTS

| 2,530,271 A | * | 11/1950 | Swindin | ................... 126/360.2 |
| 3,260,587 A | | 7/1966 | Dolf et al. | |
| 3,563,683 A | | 2/1971 | Hess | |
| 3,738,792 A | | 6/1973 | Feng | |
| 4,203,761 A | | 5/1980 | Rose | |
| 4,539,034 A | * | 9/1985 | Hanneken | ................... 65/134.4 |
| 2003/0054308 A1 | * | 3/2003 | Abbasi et al. | .............. 431/187 |

\* cited by examiner

*Primary Examiner*—Scott Kastler
(74) *Attorney, Agent, or Firm*—Mark E. Fejer (57) ABSTRACT

A submerged combustion burner having co-axial fuel and oxidant tubes forming an annular space therebetween, wherein the outer tube extends beyond the end of the inner tube. A burner nozzle having an outside diameter corresponding to the inside diameter of the outer tube is connected to the outlet end of the inner tube and forms a centralized opening in fluid communication with the inner tube and at least one peripheral longitudinally oriented opening in fluid communication with the annular space. In accordance with one embodiment, a longitudinally adjustable rod is disposed within the inner tube for adjustment of fluid flow therethrough, and a cylindrical insert having at least one flame stabilizer for stabilizing a flame produced by the burner is attached to the outlet end of the outer tube. In accordance with another embodiment, fluid flow through the inner tube is achieved by a flow control valve operably connected to the inner tube.

11 Claims, 5 Drawing Sheets

PROCESS AND APPARATUS FOR UNIFORM COMBUSTION WITHIN A MOLTEN MATERIAL

BACKGROUND OF THE INVENTION

1. Field of the Invention

This invention relates to a method and apparatus for submerged combustion melting, that is, a method and apparatus in which the hot products of combustion are introduced directly into a material for melting, such as glass, through an opening in the melt containment vessel disposed below the level of the material present in the melt containment vessel.

2. Description of Related Art

The concept of submerged combustion is not new. Most of the burners that have been developed for this purpose are applicable to aqueous systems. However, burners suitable for use in the melting of high melting temperature materials, such as glass, metals, etc. are also known. U.S. Pat. No. 3,260,587 to Dolf et al. teaches a method and apparatus for submerged combustion melting of glass or similar materials in which a burner having an air cooled casing is inserted into a furnace wall, either the furnace side wall or the furnace floor. The burner is provided with means for mixing fuel gas and air, burning them and discharging the combustion products at high temperature and velocity directly into the glass. The hot gases agitate the glass, transferring a high percentage of heat to the glass, thereby rapidly melting the glass. U.S. Pat. No. 3,738,792 to Feng describes a burner for use in submerged combustion applications which is able to use liquid fuels. In both of the '587 patent and the '792 patent, removal of the burner from the furnace for repair or replacement requires that the furnace be shut down to prevent the molten material from flowing out through the burner opening.

This problem is addressed by U.S. Pat. No. 3,563,683 to Hess which teaches a burner for use in submerged combustion applications, which includes a hollow sleeve adapted to receive the burner lining the opening in the furnace wall, which hollow sleeve is provided with passages through which a cooling fluid may flow. Upon removal of the burner from the sleeve, the cooling effect of the cooling fluid flowing through the sleeve is such that the molten material in the furnace adjacent thereto freezes, thereby preventing the molten material from escaping. An alternative solution is described by U.S. Pat. No. 4,203,761 to Rose which teaches a method and apparatus for submerged combustion melting in which the burners extend downward from the furnace roof into the molten bath. In this way, issues associated with burners disposed in the furnace wall below the level of the molten material, such as burner removal and burner clogging, are avoided altogether.

One persistent problem associated with submerged combustion melting using burners disposed in the furnace wall below the level of the molten material is flame stability. In addition, the burners of the prior art physically protrude into the furnace, affecting not only burner service life, but also affecting mixing of the molten material in the furnace.

SUMMARY OF THE INVENTION

Accordingly, it is one object of this invention to provide a method and apparatus for submerged combustion melting having improved flame stability characteristics compared to conventional submerged combustion melting apparatuses.

It is another object of this invention to provide a method and apparatus for submerged combustion melting providing improved mixing of molten materials within the melter.

It is still a further object of this invention to provide a method and apparatus for submerged combustion melting in which the burners, although oriented to deliver combustion products to the molten material through furnace wall openings disposed below the level of the molten material, do not protrude into the furnace.

It is yet another object of this invention to provide a method and apparatus for submerged combustion melting in which the burners can be fired using oxidants other than just air.

These and other objects of this invention are addressed by a method and apparatus providing heat energy to a bath of molten material and simultaneously creating a well-mixed molten material. The invention functions by firing a burning gaseous or liquid fuel-oxidant mixture into a volume of molten material. This invention provides a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process in bubbles rising to the surface of the melt.

The apparatus in accordance with one embodiment of this invention whereby these functions are performed comprises a burner comprising an inner fluid supply tube having a first fluid inlet end and a first fluid outlet end and an outer fluid supply tube having a second fluid inlet end and a second fluid outlet end coaxially disposed around the inner fluid supply tube and forming an annular space between the inner fluid supply tube and the outer fluid supply tube. A burner nozzle is connected to the first fluid outlet end of the inner fluid supply tube. The outer fluid supply tube is arranged such that the second fluid outlet end extends beyond the first fluid outlet end, creating, in effect, a combustion space or chamber bounded by the outlet to the burner nozzle and the extended portion of the outer fluid supply tube. The burner nozzle is sized with an outside diameter corresponding to the inside diameter of the outer fluid supply tube and forms a centralized opening in fluid communication with the inner fluid supply tube and at least one peripheral longitudinally oriented opening in fluid communication with the annular space between the inner and outer fluid supply tubes. In accordance with one embodiment of this invention, a longitudinally adjustable rod is disposed within the inner fluid supply tube having one end proximate the first fluid outlet end. As the adjustable rod is moved within the inner fluid supply tube, the flow characteristics of fluid through the inner fluid supply tube are modified. A cylindrical flame stabilizer element comprising at least one flame stabilizer means for stabilizing a flame produced by said burner is attached to the second fluid outlet end.

The stable flame is achieved by supplying oxidant to the combustion chamber through one or more of the openings located on the periphery of the burner nozzle, supplying fuel through the centralized opening of the burner nozzle, and controlling the development of a self-controlled flow disturbance zone by freezing melt on the top of the cylindrical flame stabilizer element. The location of the injection point for the fuel-oxidant mixture below the surface of the melting material enhances mixing of the components being melted and increases homogeneity of the melt. Thermal $NO_x$ emissions are greatly reduced due to the lower flame temperatures resulting from the melt-quenched flame and further due to insulation of the high temperature flame from the atmosphere.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

This invention relates to a method and apparatus in which a mixture of fuel and oxidant, also referred to herein as a fuel-oxidant mixture, is ignited to initiate combustion and the combustion products so generated are introduced directly into a volume of material being melted. The invention provides constant, reliable, and rapid ignition of the fuel-oxidant mixture while maintaining a stable flame beneath the surface of the melt such that the mixture burns quickly and releases the heat of combustion directly into the melt. The burner supplies energy to the material being melted in the form of thermal energy (heat release) and mechanical energy (injection of the fuel-oxidant mixture). Simultaneously therewith, the method and apparatus of this invention create a well-mixed, or homogeneous, melt from the action of the combustion products within the material being melted. This is achieved by injection of high-momentum jets of the combustion products into the melt, which improves the homogeneity of the melt and the quality of the final product. By the term "high-momentum," we mean momentum sufficient to overcome the liquid pressure, to create a desired mixing pattern in the melt, and to create forced upward travel of the flame and combustion products. Velocity of the combustion products is in the range of about 10 ft/sec to about 500 ft/sec.

The submerged combustion burner of this invention has a design that allows continuous and reliable firing directly into the volume of material being melted and, subsequently, directly into the bath of molten material. The burner is capable of firing gaseous and liquid fuels, alone or in combination, including, but not limited to, natural gas, liquefied, low-BTU gas, waste gas, hydrogen, hydrogen-enriched fuel gas, syngas, other combustible gases, and fuel oil of various compositions. The preferred fuels are gaseous fuels. Suitable oxidants for use in accordance with one preferred embodiment of this invention are selected from the group consisting of oxygen, oxygen-enriched air (up to 80% oxygen), air, or any gas containing oxygen. The submerged combustion burner may be operated in both fuel-lean and fuel-rich modes, thereby providing either an oxidizing or reducing atmosphere. In accordance with one preferred embodiment of this invention, the burner is operable with an equivalence ratio in the range of about 0.5 to 2.0. In accordance with one preferred embodiment, at least one of the fuel and oxidant is preheated. In accordance with one embodiment of this invention, at least a portion of the fuel is injected preheated into the melt together with the feed (batch) material through separate nozzles. This allows for the use of solid or highly viscous liquid fuels. Additional oxidant or fuel can be injected above the melt to complete the combustion process, provide additional heat, minimize particulate carryover, and decrease the amount of foaming on the melt surface.

Figure 1:
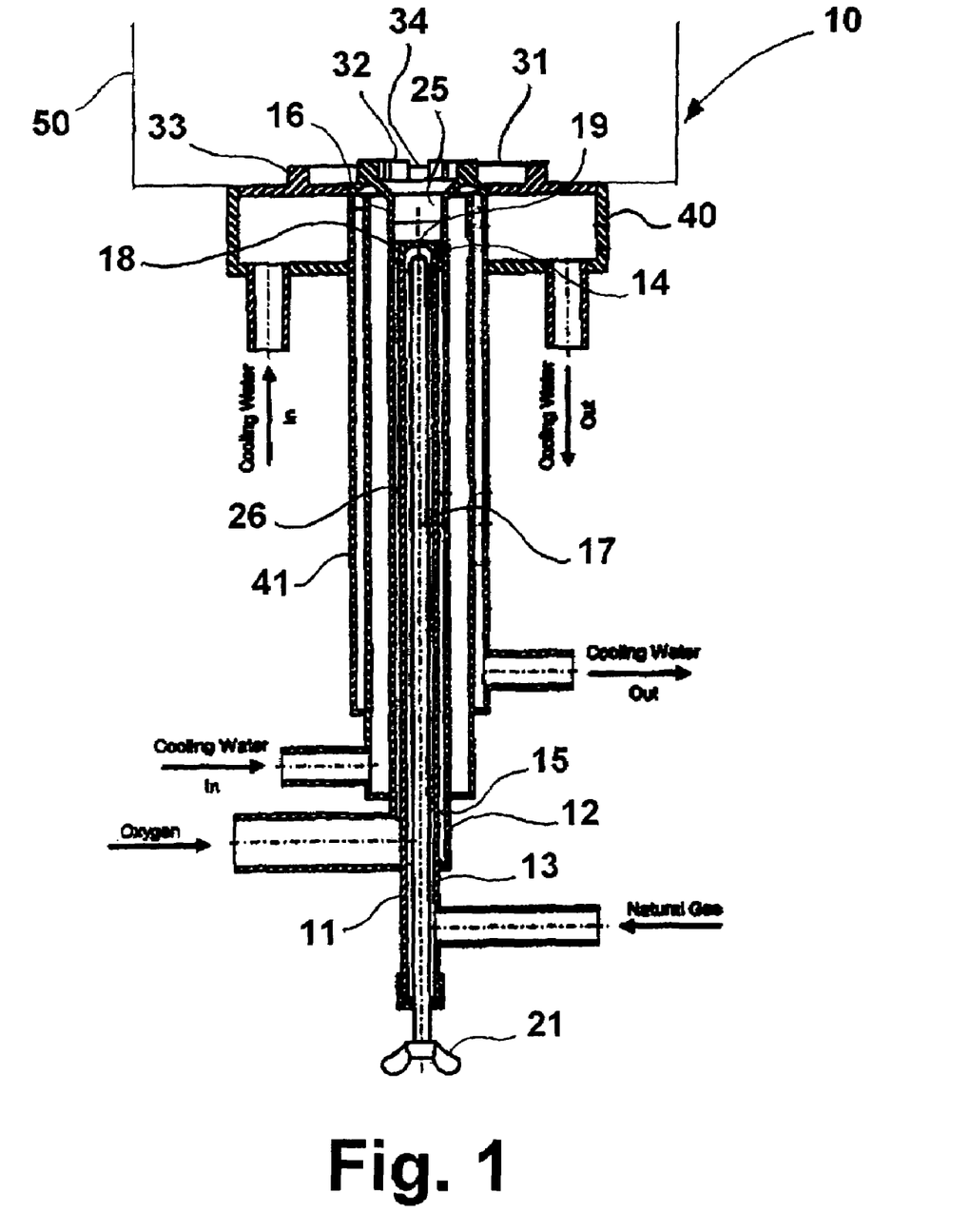
FIG. 1 is a cross-sectional lateral view of a submerged combustion melting burner in accordance with one embodiment of this invention.

FIG. 1 shows a submerged combustion burner 10 in accordance with one embodiment of this invention. As shown, submerged combustion burner 10 comprises an inner fluid supply tube 11 having a first fluid inlet end 13 and a first fluid outlet end 14 and an outer fluid supply tube 12 coaxially disposed around inner fluid supply tube 11 having a second fluid inlet end 15 and a second fluid outlet end 16, which second fluid outlet end 16 extends beyond first fluid outlet end 14 of inner fluid supply tube 11, and forming an annular space 26 therebetween. Burner nozzle 18 having an outside diameter corresponding to the inside diameter of outer fluid supply tube 12 is connected with first fluid outlet end 14 of inner fluid supply tube 11. A cylindrical flame stabilizer element 33, described in more detail herein below, having a centralized opening 34 substantially corresponding in size to the inside diameter of outer fluid supply tube 12, which is in fluid communication with outer fluid supply tube 12, is connected with second fluid outlet end 16 of outer fluid supply tube 12. The effect of this arrangement is the formation of a combustion space or chamber 25 bounded in part by the surface of burner nozzle 18, the portion of outer fluid supply tube 12 extending beyond burner nozzle 18, and cylindrical flame stabilizer element 33.

Figure 2:
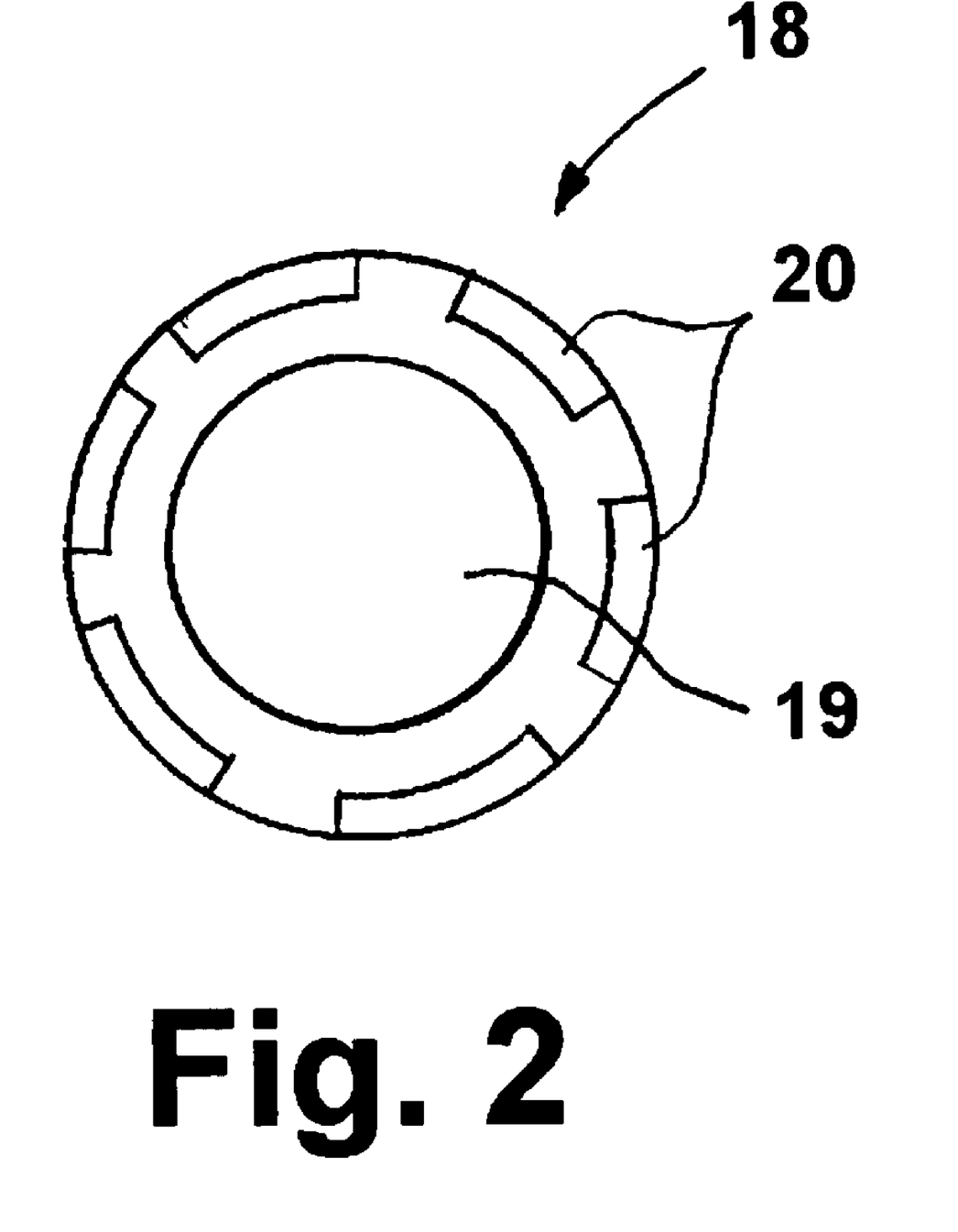
FIG. 2 is a plan view of the burner nozzle for the submerged combustion melting burner in accordance with one embodiment of this invention.
Figure 3:
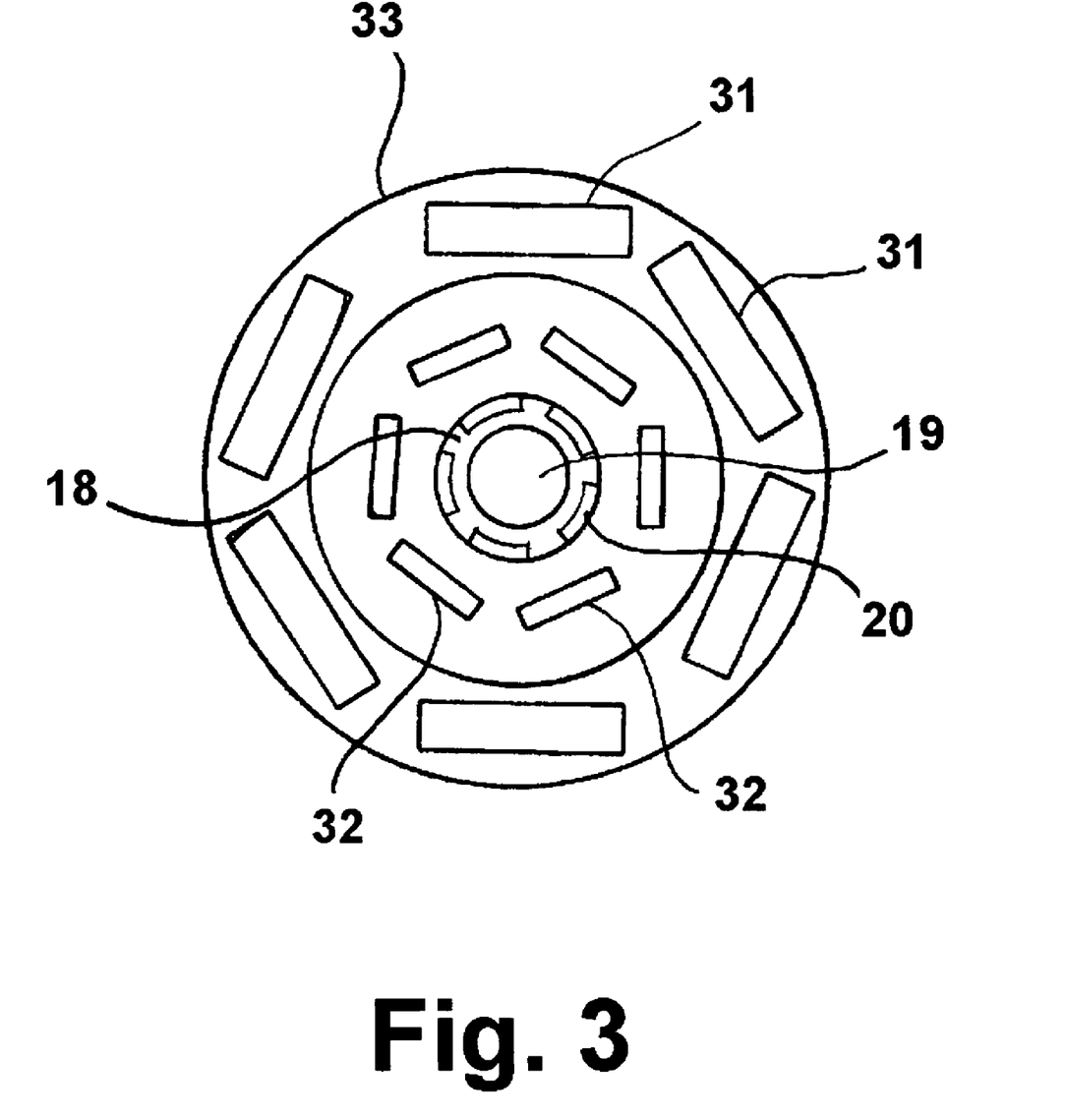
FIG. 3 is a top down view of a submerged combustion melting burner in accordance with one embodiment of this invention.

Burner nozzle 18, as more clearly shown in FIGS. 2 and 3, forms a centralized opening 19, which is in fluid communication with inner fluid supply tube 11, through which a first fluid is supplied to combustion chamber 25. In addition to centralized opening 19, burner nozzle 18 forms at least one peripheral, longitudinally oriented opening 20, which is in fluid communication with annular space 26, through which a second fluid is supplied to combustion chamber 25. In accordance with a particularly preferred embodiment of this invention, the first fluid, supplied through centralized opening 19 is a fuel and the second fluid, supplied through peripheral openings 20, is an oxidant, preferably air, oxygen-enriched air or substantially pure oxygen. Alternatively, the fuel may be provided to combustion chamber 25 through peripheral openings 20 and the oxidant may be supplied through centralized opening 19 of burner nozzle 18.

To provide effective cooling to the submerged combustion burner 10, two separate cooling jackets are provided. The first of these cooling jackets 40 is disposed around combustion chamber 25 and the second of these cooling jackets 41 is disposed around the exterior of outer fluid supply tube 12. Although any cooling fluid able to provide the desired cooling effect, including air, may be used, the preferred cooling fluid is water.

A key aspect of this invention relates to the dimensional features of the combustion chamber 25. As shown in FIG. 1 and in contrast to conventional submerged combustion burners in which the combustion chamber tapers in the direction of the submerged combustion melter, there is no tapering of the combustion chamber 25 of the burner of this invention. In conventional submerged combustion burners, the narrowing of the combustion chamber in the direction of the submerged combustion melter is required to increase the velocity of the combustion products exiting from the combustion chamber and entering the submerged combustion melter. This increase in velocity is required in order to maintain stable combustion. In contrast thereto, stable combustion is maintained in accordance with the invention claimed herein by the cylindrical flame stabilizer element 33 connected with the second fluid outlet end 16 of outer fluid supply tube 12, a consequence of which is that tapering of the combustion chamber 25, in contrast to conventional submerged combustion burners, is not necessary.

As is apparent from the above description, the submerged combustion burner of this invention utilizes a design in which fuel and oxidant are supplied to combustion chamber 25 through separate channels. This approach allows the burner to operate continuously and reliably over a very wide turndown ratio range up to 10 to 1. The combustion is initiated in fluid-cooled combustion chamber 25. In accordance with a particularly preferred embodiment, the fuel is supplied through centralized opening 19 of burner nozzle 18 and the oxidant is supplied through the peripheral openings 20. The inner fluid supply tube 11, e.g. the fuel supply tube, is connected to the bottom part of burner nozzle 18, and the other end of the fuel supply tube is connected to the fuel source. The outer fluid supply tube 12, e.g. the oxidant supply tube, is disposed co-axially with the fuel supply tube, forming the wall of combustion chamber 25 at the top. At the bottom, the oxidant tube is connected to an oxidant source.

Disposed within inner fluid supply tube 11 is a longitudinally adjustable rod 17 having one end disposed proximate centralized opening 19 of burner nozzle 18 such that longitudinal adjustment of the rod enables the rod end to travel in and out of the centralized opening, thereby enabling control of fuel flow into combustion chamber 25. Adjustment of adjustable rod 17 may be achieved using any suitable means, either automatic or manual, such as adjusting gear 21. Fuel flow through supply tube 11 can also be controlled by removal of longitudinal rod 17 and use of a conventional flow control valve.

It will be apparent to those skilled in the art that one of the major problems associated with submerged combustion burners is flame stabilization. An additional problem that must be addressed relates to ensuring adequate mixing of the raw and molten materials within the submerged combustion melter. To provide the required flame stabilization, a cylindrical insert 33 is operably connected with the second fluid outlet end 16 of outer fluid supply tube 12, also corresponding to the combustion products outlet from combustion chamber 25, which cylindrical insert 33 comprises a plurality of projections 31, 32, as shown in FIG. 3, extending in the direction of submerged combustion melter 50, as shown in FIG. 1. Although shown in FIG. 3 as having two circumferential rows of projections, multiple such rows are not a requirement of this invention. In accordance with one preferred embodiment of this invention, projections 31, 32 are rectangular in shape.

Operation of the submerged combustion burner in accordance with one embodiment of this invention is as follows. Fuel and oxidant are supplied to combustion chamber 25 as described above. The fuel and oxidant are mixed in co-current jets within combustion chamber 25. The resulting fuel-oxidant mixture is ignited by any suitable means, preferably a pilot flame or spark plug. Combustion of the mixture is, thus, initiated within the combustion chamber, resulting in only partial combustion of the mixture due to the relatively small size of combustion chamber 25, forming a plurality of partial combustion products. The combustion products generated within combustion chamber 25 continue above the chamber and into the molten material in which combustion is completed in the bubbles formed within and rising to the surface of the melt.

Flame stabilization is achieved, partially due to a flow recirculation zone formed within combustion chamber 25, and partially due to the formation of a flow disturbance region at the top of the cylindrical insert 33 and water-cooled jacket 40. During burner operation, a small amount of the molten material solidifies at the top of cylindrical insert 33 and fluid-cooled jacket 40. The flow recirculation and flow disturbance zones are formed, at least in part, due to the tendency of solid particles within the melt to be deposited in regions where shear stress is low. Frozen layers propagate inside the molten material until they reach thermal equilibrium. Propagation of the frozen melt inside the volume of the molten media expands the flow disturbance zone which improves flame stability. Therefore, formation of a frozen layer on the top of the burner helps to achieve a stable flame. The stoichiometric ratio can be varied by adjusting the position of adjustment rod 17 and/or by changing the flow rates of the fuel and oxidant supplied into combustion chamber 25.

During operation of submerged combustion burner 10, the partial combustion products as well as any uncombusted fuel and oxidant, enter the submerged combustion melter in a substantially axial direction with respect to the burner. Swirling is avoided to prevent the creation of a force capable of pulling molten material down into the burner. As a result, the burner is kept clear of molten material and stable combustion is maintained. Simultaneously with the introduction of fuel, oxidant, and partial combustion products into the submerged combustion melter in a predominantly axial manner, the velocity of the jets (preferably in the range of about 10 ft/sec to about 200 ft/sec), the sizes of the jets, the depth of the molten material in the submerged combustion melter, and the placement of burners below the submerged combustion melter are all such as to provide uniform mixing in the melter while the molten material is also being heated.

Application of the submerged combustion burner of this invention significantly reduces nitrogen oxides emissions compared to conventional submerged combustion burners. In the combustion of fuel and oxidant, it is known that flame temperature increases markedly as the oxygen concentration in the oxidant gas increases. Use of pure oxygen as the oxidant gas, thereby eliminating from the process the nitrogen present in air, does not solve the problem of $NO_x$ pollution because sufficient nitrogen is usually present in the fuel or in the furnace through air leaks (which are unavoidable in industrial scale operation) to still generate $NO_x$. The problem of air aspiration is eliminated by firing the burner inside the melt and by freezing a layer of the solid material around the injection point. The high temperature zone becomes virtually insulated from the environment when a sufficient amount of molten material accumulates above the burner and freezes on the top. Thermal $NO_x$ emissions are negligible, with the only $NO_x$ generated coming from the fuel.

Certain physical advantages are also realized from firing the burner directly up into the molten bath. These include 1) production of a very well mixed, homogeneous melt composition even when the material is amorphous (such as glass, waste, mineral wool, etc.), and 2) production of a melt with a certain amount of gaseous bubble inclusions. A well-mixed molten bath provides means to eliminate flaws from non-uniform compositions that are present when stirring is not complete. High levels of homogeneity are also advantageous when vitrifying wastes in order to assure glassification of any volatile and labile components.

For some molten materials, the presence of bubbles is undesirable, and steps must be taken to remove the bubbles. Other materials, however, can either tolerate bubbles or benefit from their presence. For example, insulating materials including fiberglass and mineral wool routinely are manufactured with bubbles present, and so long as the bubble size and concentration are below accepted limits, bubbles have no impact on product quality or performance. Other materials such as reflective glass beads and vitrified wastes are also unaffected by the presence of bubbles. Abrasives produced by melting can also have bubbles, so long as the bubbles are small enough and in low enough concentration so as not to interfere with performance during abrasive 'working'.

The manufacturing of sodium silicate, commonly referred to as water glass, actually benefits from bubbles present in the product. Sodium silicate is routinely produced in high temperature tank furnaces such as glass furnaces. The product glass is then dissolved in hot water and sold in liquid form. Testing of the rate of dissolution of sodium silicate with no bubbles and sodium silicate with bubbles into hot water determined that the bubbly sodium silicate dissolved more than three times faster than the bubble-free sodium silicate. Test results are shown below.

| Sample | Bubble Free | Bubbled |
|---|---|---|
| Dissolution Temperature, ° F. | 300 | 300 |
| Dissolution Time, min | 120 | 120 |
| Initial Mass, g | 515.5 | 451.0 |
| Final Mass, g | 486.1 | 350.0 |
| Weight Loss, % | 6 | 22 |
| Dissolution Mass Flux, g/cm$^2$h | 0.077 | 0.31 |
| Mass Loss / Mass Loss of Bubble Free Sample | 1.0 | 3.7 |
| Dis. Mass Flux / Dis. Mass Flux of Bubble Free Sample | 1.0 | 4.0 |

The testing was not optimized to find the variation of dissolution rate with bubble concentration and size, but the results clearly show that sodium silicate with bubbles dissolves into water much faster than sodium silicate with no bubbles.

Figure 4:
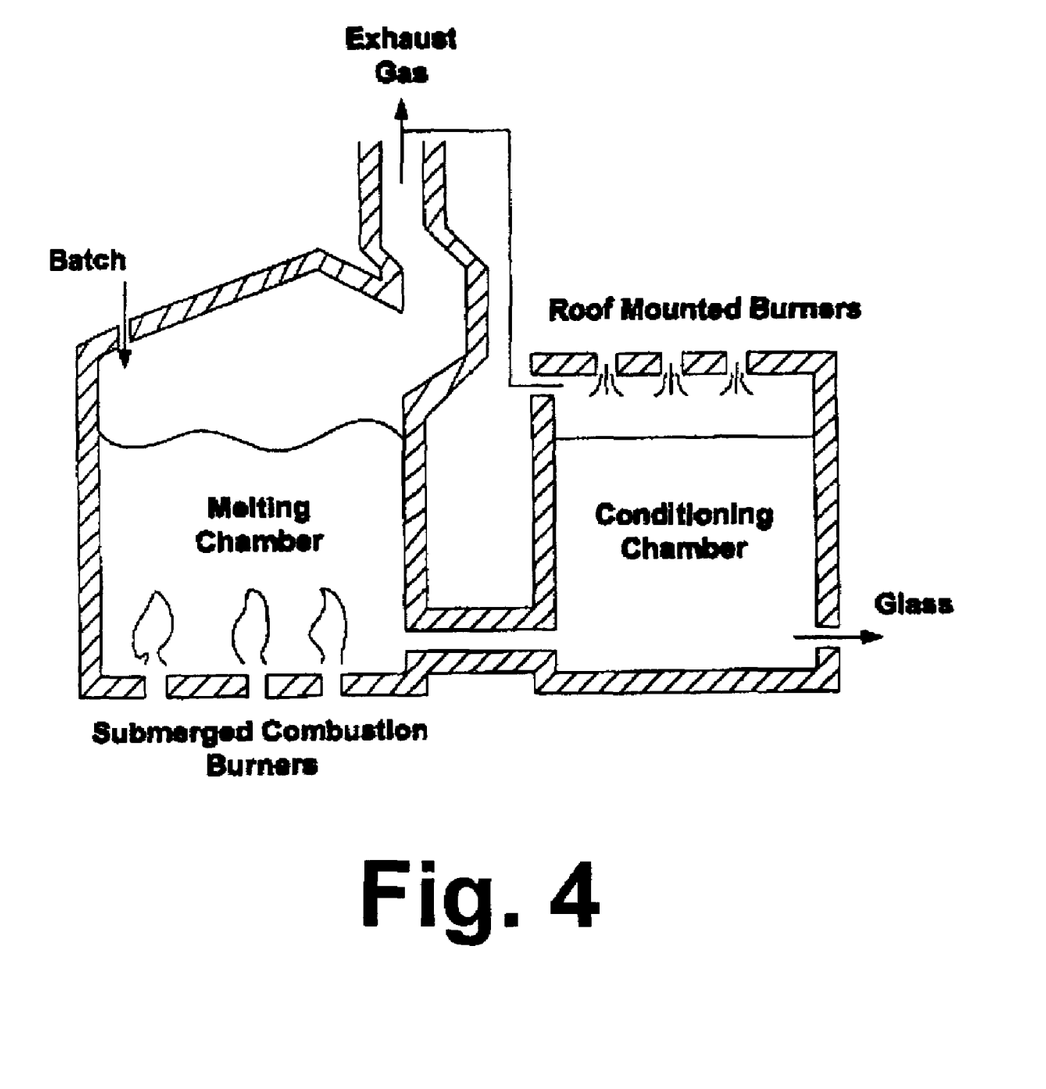
FIG. 4 is a general diagram showing the basic features of a submerged combustion melter in combination with a conditioning chamber for conditioning of the molten material employing roof mounted burners.

Submerged combustion melters are designed to melt a wide range of high-melting point, mostly low organic content, inorganic materials. Examples of materials melted in this industrial process are mineral wool, wastes (that are vitrified), abrasive materials, and many types and qualities of commercial glass. In the case of glass, material to be melted, i.e. batch material and/or cullet, is charged to the submerged combustion melter, also referred to herein as melt chamber, in which oxidant(oxygen, oxygen-enriched air, or air)-fuel burners are fired below the surface of the material to be melted. Burners can be located on either the bottom or sidewalls of the melt chamber, which can have a variety of different shapes. FIG. 4 is a schematic diagram of a submerged combustion system employing a combination of submerged combustion burners, the operation of which results in the formation of bubbles within the molten material, and a conditioning chamber having roof-mounted burners for providing heat to the molten material, in which chamber the bubbles within the molten material are allowed to escape from the molten material. This process produces very high heat transfer rates. At the same time, high shear from the passage of combustion gases through the melt leads to a high mass transfer rate and a well-mixed or homogeneous molten product. The melting chamber is significantly smaller than a traditional glass tank-type melting furnace. Mixing that produces the high mass transfer rates and rapid mixing of the melt would abrade a refractory wall in a short period of time. Therefore, the walls of the melt chamber, and other critical surfaces such as the melt chamber roof, are made from fluid-cooled panels. The coolant fluid can be water or some other material. The cooled walls cause a layer of frozen melt to be formed on all surfaces. This protects the walls, seals the unit, and leads to the molten glass only coming in contact with frozen glass of the same composition.

Figure 5:
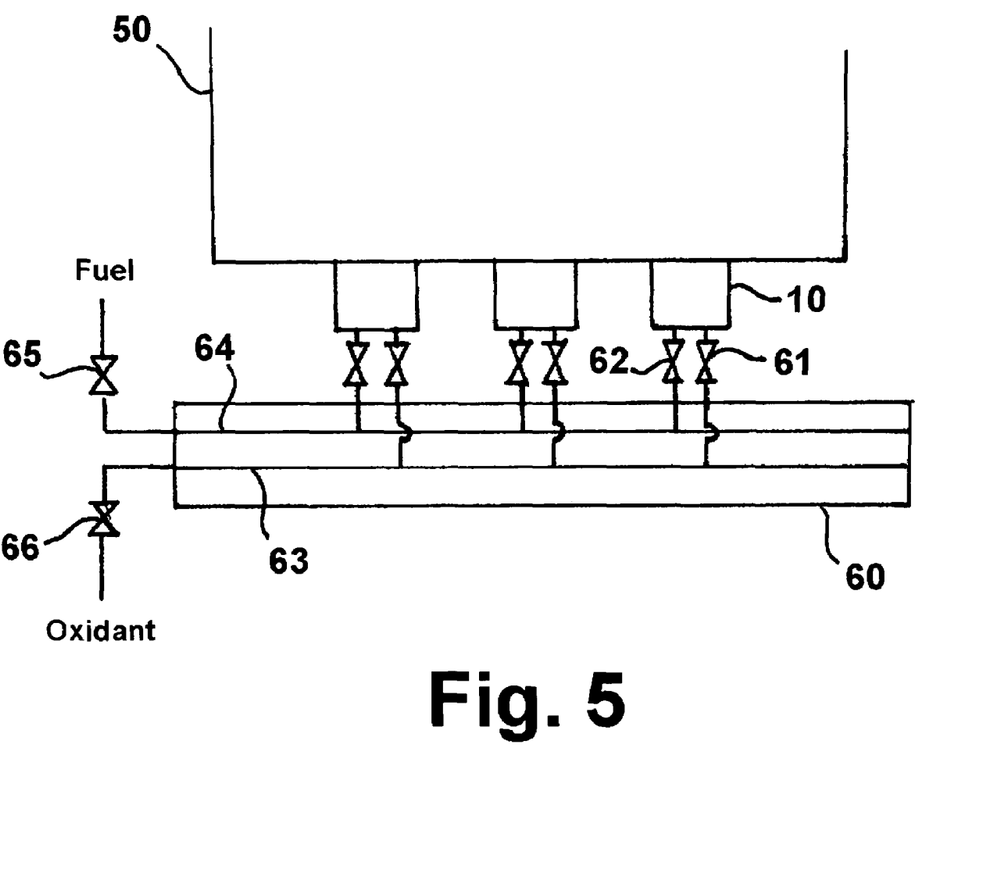
FIG. 5 is a schematic diagram of a manifold burner system employing a plurality of submerged combustion melting burners, in which system fuel and oxidant are simultaneously supplied to said plurality of burners to simplify the number of required fuel and oxidant flow control systems.

It will be apparent to those skilled in the art that it may be desirable to apply heat at a plurality of locations within the melt. To accommodate such a desire, in accordance with one embodiment of this invention, a plurality of submerged combustion burners are employed. To facilitate control of the plurality of burners, the burners 10 are manifolded together as shown in FIG. 5, receiving fuel and oxidant from individual fuel and oxidant inlets, 65 and 66, respectively, to the manifold 60 at which the fuel and oxidant streams flowing through manifold fuel supply line 64 and manifold oxidant supply line 63 are set, measured and controlled. Each burner 10 then receives a percentage of the provided fuel and oxidant, which may be further controlled by burner fuel control valve 62 and burner oxidant control valve 61, which are in fluid communication with each burner 10. Such manifolding of the burners provides a significant reduction in equipment costs and simplification in the fuel and oxidant supply system compared to conventional systems in which fuel and oxidant supply to each burner is individually controlled.

In summary, the submerged combustion burner of this invention provides a number of features not available in any other burner known to us. These non-obvious and beneficial features include:

1) Location of the burner completely outside the melt tank, facilitating long life, reliable operation (because it can be easily removed from the mounting flange connected to the melt tank), and easy service;
2) Firing of the burner with air, oxygen-enriched air, or oxygen, a feature provided by the mixing and firing design, and not offered by any other burner of this type;
3) An extremely wide turndown ratio of 10:1, provided by the method used to stabilize the flame;
4) Completely stable flame because of the combustion chamber and the flow disturbance zone at the top of the burner;
5) Occurrence of combustion in three stages, with combustion stabilized in combustion chamber 25 and the flow disturbance zone, combustion continuing in the main flame inside the melt, and combustion being completed in the bubbles rising to the surface of the melt;
6) Active mixing when firing into a bath of molten material, thereby forming a homogeneous melt, caused by the flame and combustion products; and
7) Passage of combustion products through the molten material leaving a certain number and concentration of bubbles in the product.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. In an apparatus comprising at least one wall defining a chamber containing a molten material and forming at least one opening below a surface of said molten material providing fluid communication between said molten material and a burner outlet, and a burner operably connected to said at least one wall, the improvement comprising:

said burner comprising an inner fluid supply tube having a first fluid inlet end and a first fluid outlet end, an outer fluid supply tube having a second fluid inlet end and a second fluid outlet end coaxially disposed around said inner fluid supply tube and forming an annular space between said inner fluid supply tube and said outer fluid supply tube, said second fluid outlet end extending beyond said first fluid outlet end, a burner nozzle connected to said first fluid outlet end of said inner fluid supply tube having an outside diameter corresponding to an inside diameter of said outer fluid supply tube and forming a centralized opening in fluid communication with said inner fluid supply tube and at least one peripheral longitudinally oriented opening in fluid communication with said annular space, flow control means for controlling a flow of fluid within said inner fluid supply tube, and a cylindrical insert attached to said second fluid outlet end comprising at least one flame stabilizer means for stabilizing a flame produced by said burner.

2. An apparatus in accordance with claim 1, wherein a fluid cooled jacket having a coolant inlet and a coolant outlet is disposed around said outer fluid supply tube.

3. An apparatus in accordance with claim 1, wherein a fluid cooled jacket having a coolant inlet and a coolant outlet is disposed around said outer fluid supply tube.

4. An apparatus in accordance with claim 1, wherein said inner fluid supply tube is in fluid communication with a fuel supply and said outer fluid supply tube is in fluid communication with an oxidant supply.

5. An apparatus in accordance with claim 1, wherein said inner fluid supply tube is in fluid communication with an oxidant supply and said outer fluid supply tube is in fluid communication with a fuel supply.

6. An apparatus in accordance with claim 1, wherein said flow control means comprises one of a longitudinally adjustable rod disposed within said inner fluid supply tube having one end proximate said first fluid outlet end of said burner and a fluid flow control valve operably connected to said inner fluid supply tube.

7. An apparatus comprising:

at least one wall defining a combustion chamber having a fuel inlet and an oxidant inlet and a combustion products outlet;

at least one melter wall defining a melting chamber containing a bath of material suitable for melting comprising at least one of a solid, partially molten and totally molten said material, said at least one melter wall forming a combustion products inlet opening below a surface of said bath in direct fluid communication with said combustion products outlet; and at least one burner operably connected to said combustion chamber having a burner fuel inlet, an oxidant inlet, a fuel outlet and an oxidant outlet, said fuel outlet in fluid communication with said fuel inlet and said oxidant outlet in fluid communication with said oxidant inlet, said at least one burner comprises an inner fluid supply tube having a first fluid inlet end and a first fluid outlet an outer fluid supply tube having a second fluid inlet end and a second fluid outlet end coaxially disposed around said inner fluid supply tube and forming an annular space between said inner fluid supply tube and said outer fluid supply tube, said second fluid outlet end extending beyond said first fluid outlet end, a burner nozzle connected to said first fluid outlet end of said inner fluid supply tube having an outside diameter corresponding to an inside diameter of said outer fluid supply tube, said burner nozzle forming a centralized opening in fluid communication with said inner fluid supply tube and at least one peripheral longitudinally oriented opening in fluid communication with said annular space.

8. An apparatus in accordance with claim 7, wherein a longitudinally adjustable rod is disposed within said inner fluid supply tube having one end proximate said first fluid outlet end.

9. An apparatus in accordance with claim 7 further comprising a cylindrical insert attached to said second fluid outlet end comprising at least one flame stabilizer means for stabilizing a flame produced by said burner.

10. An apparatus in accordance with claim 7, wherein said at least one wall defines a plurality of said combustion chambers and at least one said burner is operable connected to each said combustion chamber.

11. An apparatus in accordance with claim 10 further comprising at least one of a fuel manifold and an oxidant manifold, said fuel manifold having a manifold fuel outlet in fluid communication with said burner fuel inlet of each said burner and said oxidant fuel manifold having a manifold oxidant outlet in fluid communication with said burner oxidant inlet of each said burner.

* * * * *